(12) United States Patent
Yun (10) Patent No.: US 8,254,678 B2
(45) Date of Patent: Aug. 28, 2012

(54) IMAGE SEGMENTATION

(75) Inventor: Il Dong Yun, Seongnam-si (KR)

(73) Assignee: Hankuk University of Foreign Studies Research and Industry-University Cooperation Foundation, Gyeonggi-do (KR)

( * ) Notice: Subject to any disclaimer, the term of this patent is extended or adjusted under 35 U.S.C. 154(b) by 991 days.

(21) Appl. No.: 12/199,515

(22) Filed: Aug. 27, 2008

(65) Prior Publication Data
US 2010/0054596 A1  Mar. 4, 2010

(51) Int. Cl.
*G06K 9/34* (2006.01)
*G06K 9/46* (2006.01)

(52) U.S. Cl. ........ 382/173; 382/195; 382/284; 348/241; 715/764

(58) Field of Classification Search .......... 382/154, 382/164, 171, 173, 180, 195, 199, 274, 284; 455/450; 348/241
See application file for complete search history.

(56) References Cited

U.S. PATENT DOCUMENTS

| | | | |
|---|---|---|---|
| 7,720,282 B2 * | 5/2010 | Blake et al. | 382/173 |
| 2007/0031028 A1 * | 2/2007 | Vetter et al. | 382/154 |
| 2009/0278859 A1 * | 11/2009 | Weiss et al. | 345/629 |
| 2010/0166339 A1 * | 7/2010 | Gokturk et al. | 382/305 |

FOREIGN PATENT DOCUMENTS
WO   WO 2006/138730   12/2006

* cited by examiner

*Primary Examiner* — Ali Bayat
(74) *Attorney, Agent, or Firm* — NSIP Law (57) ABSTRACT

Techniques for segmenting images are disclosed.

8 Claims, 8 Drawing Sheets

IMAGE SEGMENTATION

BACKGROUND

The extraction of a desired object from an image is referred to as object segmentation. The segmented object may be suited for the application of object recognition, modeling or the like. Recently, an image segmentation technology known as "GrabCut" (also known as "Interactive Foreground Extraction using Iterated Graph Cuts" or "Interactive Image Segmentation using an adaptive GMMRF model") has been made publicly available by Microsoft® Research Cambridge UK. An overview of the GrabCut technique may be found in Rother et al., "GrabCut: Interactive foreground extraction using iterated graph cuts," ACM Trans. Graph., vol. 23, No. 3, 2004, pp. 309-314. The GrabCut technique makes it possible to remove a background behind an object from an image with a mouse pointer aided operation.

One of the problems encountered with the GrabCut technique alone is that it requires manual input in selecting objects within images. Inherent limitations imposed by the GrabCut technique cause the resulting quality of segmentation to be unpredictable and otherwise poor, requiring experimentation on the part of the operator.

SUMMARY

Various embodiments of segmenting images are provided. In one embodiment, by way of non-limiting example, a method for segmenting images includes registering a first image having a first segmentable object, registering a second image having a second segmentable object with visual properties similar to the first segmentable object, extracting a plurality of first feature points from the first image, extracting a plurality of second feature points from the second image, matching at least a portion of the plurality of first feature points with at least a portion of the plurality of second feature points to identify a plurality of matched feature points for at least one of the first and second images, classifying the plurality of matched feature points as one of a foreground area and a background area, and segmenting at least one of the first and second segmentable objects from at least a respective one of the first and second images based on the plurality of matched feature points in the foreground area.

This Summary is provided to introduce a selection of concepts in a simplified form that are further described below in the Detailed Description. This Summary is not intended to identify key features or essential features of the claimed subject matter, nor is it intended to be used limit the scope of the claimed subject matter.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and made part of this disclosure.

Figure 1:
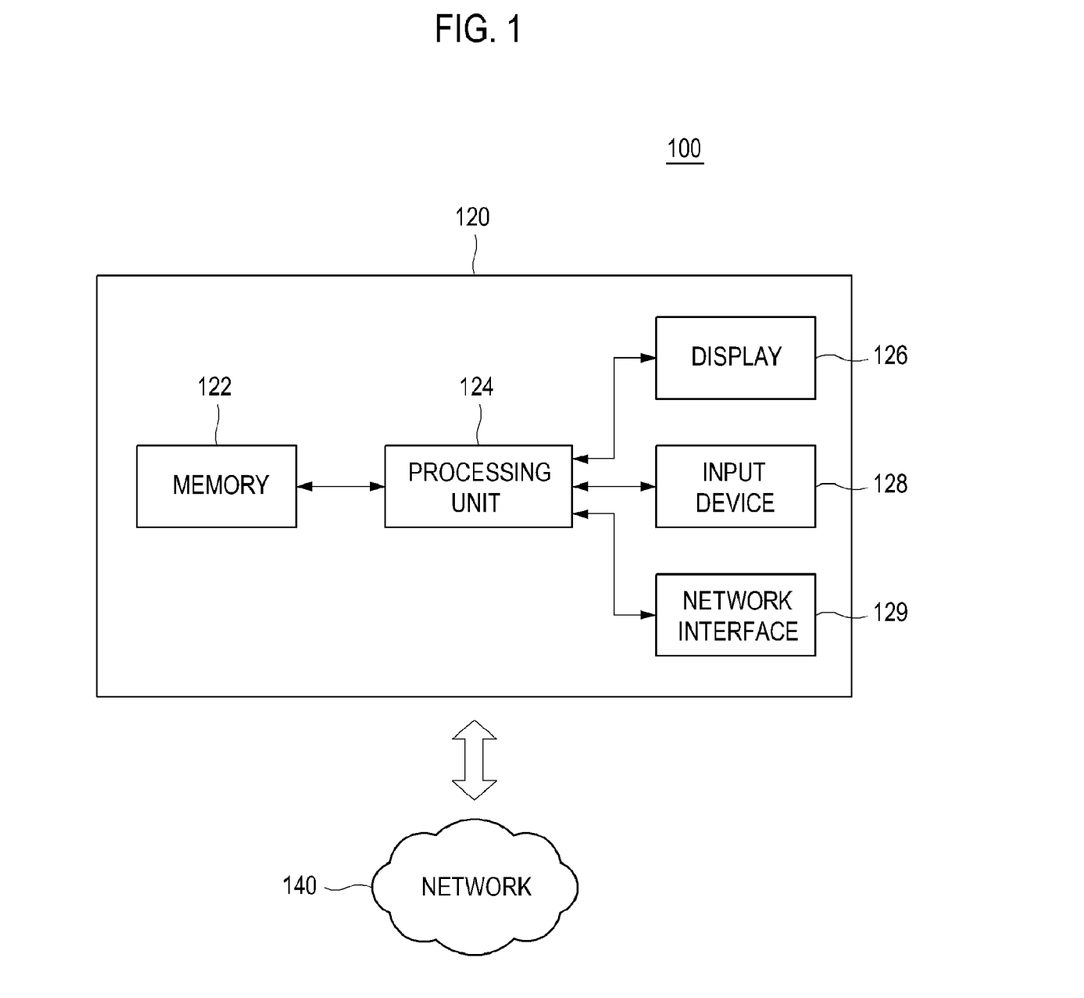
FIG. 1 shows a schematic diagram showing an illustrative embodiment of a suitable computing environment in which image processing may be implemented to segment objects from background regions.

In various illustrative embodiments, there is provided a method for segmenting images to obtain a desired object from the images. FIG. 1 is a schematic diagram showing an illustrative embodiment of a suitable computing environment in which image processing may be implemented to segment objects from background regions. As depicted in FIG. 1, an exemplary computing environment 100 for implementing the image processing includes a computing device 120. Computing device 120 includes a memory 122, a processing unit 124, a display 126, an input device 128, and a network interface 129. Memory 122 includes, but is not limited to, RAM, ROM, EEPROM, flash memory, CD-ROM, DVD or other optical storage, magnetic cassettes, magnetic tape, magnetic disk storage, or any other medium which can be used to store image information and which can be accessed by processing unit 124. In some embodiments, memory 122 may be separate from computing device 120.

Processing unit 124 may provide a platform for running a suitable operating system configured to manage and control the operations of computing device 120, including the input and output of data to and from software applications (not shown). The operating system provides an interface between the software applications being executed on computing device 120 and, for example, the hardware components of computing device 120. The disclosed embodiments may be used with various suitable operating systems, such as Microsoft® Windows , Apple® Macintosh® Operating System, UNIX® operating systems, LINUX® operating systems and the like.

Display 126 of computing device 120 includes, but is not limited to, flat panel displays as well as CRT displays. Input device 128 of computing device 120 includes, but is not limited to, a keyboard, a mouse, a pen, a voice input device, a touch input device. Network interface 129 may implement suitable communication protocols to allow computing device 120 to communicate with other computing devices (not shown) through a network 140.

Network 140 may preferably be the Internet or other similar wide area network, provided by one or more telecommunications companies allowing computing device 120 to access other computing devices, such as servers of Google®, Yahoo®, and MSN®, over a wide geographic area.

Computing environment 100 of FIG. 1 is only one example of a suitable operating environment and is not intended to suggest any limitation with regard to claimed subject matter. Other well known computing systems, environments, and/or configurations that may be suitable for image processing described herein include, but are not limited to, personal computers, server computers, hand-held or laptop devices, multiprocessor systems, micro-processor based systems, programmable consumer electronics, network personal computers, mini-computers, mainframe computers, distributed computing environments that include any of the above systems or devices, and the like.

Figure 2:
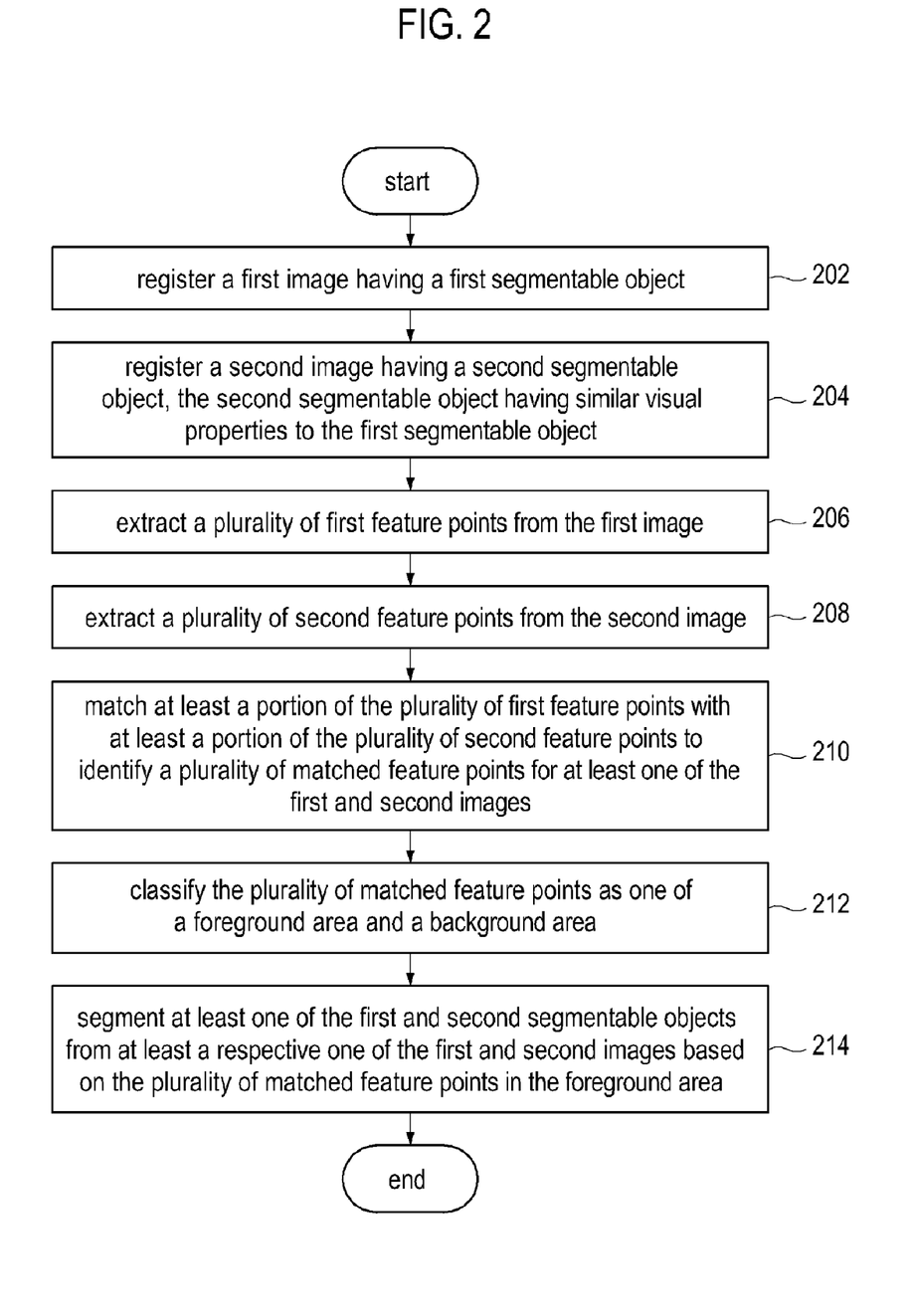
FIG. 2 shows a flowchart of an illustrative embodiment of a process for segmenting multiple images.

FIG. 2 is a flowchart of an illustrative embodiment of a process for segmenting multiple images. As depicted in FIG. 2, the process begins at block 202 where a first image 310 (shown in FIG. 3) having a first segmentable object 302 (also shown in FIG. 3) may be registered. At block 202, first image 310 having first segmentable object 302 to be segmented may be registered in computing device 120. In one embodiment, the user may select one of the images pre-stored in memory 122 through the use of input device 128 for registration as first image 310. In another embodiment, databases of other computing devices (not shown) may be accessed through network 140 to search for a desired image and download it for storage in memory 122 of computing device 120. The downloaded image may be registered as first image 310.

Figure 3:
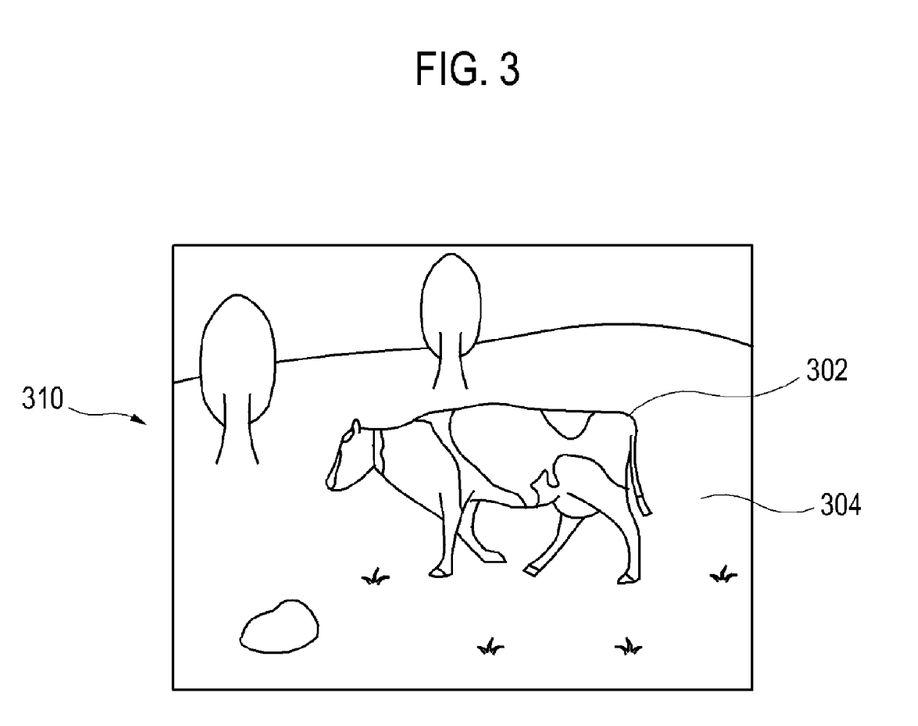
FIG. 3 shows an illustrative embodiment of a first image with a first segmentable object.

Once first image 310 is registered, first image 310 may be presented on display 126 of computing device 120. For example, an image of a cow walking in a field may be presented on display 126 as registered first image 310, as shown in FIG. 3. As shown, first image 310 includes a background 304 and first segmentable object 302 to be segmented from background 304. In this respect, the cow represents first segmentable object 302 and the image of the cow may be the subject image to be segmented from first image 310.

Referring back to FIG. 2, at block 204, a second image 410 (shown in FIG. 4) having a second segmentable object 402 (also shown in FIG. 4) with visual properties similar to first segmentable object 302 in first image 310 may be registered. Second segmentable object 402 may have generally similar visual properties to first segmentable object 302 and may include objects generally similar in appearance to first segmentable object 302 but that have been depicted from different viewpoints, with different backgrounds, from different distances, and/or at different times. As in block 202, second image 410 may be registered in computing device 120 by performing an image search locally in memory 122 of computing device 120 or accessing one or more other computing devices (not shown) through network 140. In this respect, the image search and/or access to other computing devices may be conducted with the aid of manual input by the user, namely by searching for and selecting images based on name or keyword.

In one embodiment, by way of non-limiting example, the image search may be conducted using contents-based image retrieval (CBIR). CBIR (also known as query by image content (QBIC) and content-based visual information retrieval (CBVIR)) is a known process suitable for retrieving digital images from large databases. The term "content" may refer to colors, shapes, textures, or any other information that can be attributed to visual characteristics of an image. "Content-based" refers to the use of the contents of the image in the analysis thereof Such a "content-based" search does not necessarily need to rely on metadata, such as captions or keywords.

CBIR may be used to retrieve images from large repositories of unregistered images, images which are not already registered by the method of the present disclosure, based upon the contents of the images. In response to an image query, CBIR may allow retrieval of an unregistered image or a collection of unregistered images from a database where those unregistered images share similar content to the content of a query image, and/or share matching image features (e.g., matching texture, color, spatial constraints, or any relevant combination thereof). Therefore, CBIR may be used to aid in registering the first and second images 310 and 410 without the necessity of manual input from a user. Claimed subject matter is not, however, limited to registering images using CBIR techniques.

Figure 4:
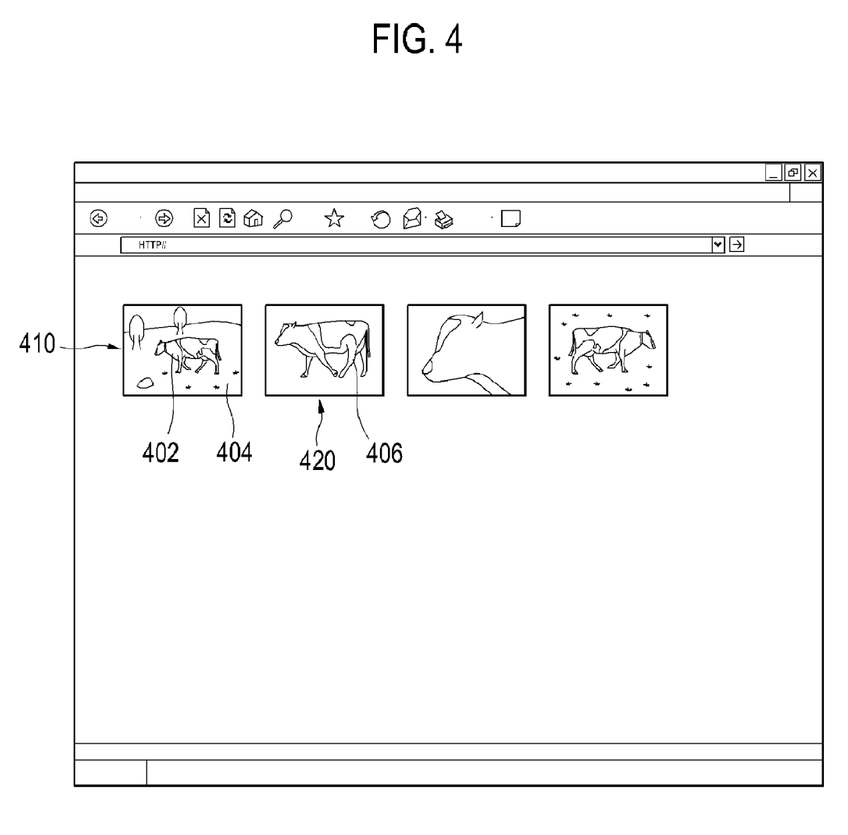
FIG. 4 shows an illustrative embodiment of a retrieval result screen for selecting a second image.

Registering the image may be accomplished by searching for a name of first segmentable object 302 in first image 310. Thus, second image 410 may be retrieved using the name of first segmentable object 302 in first image 310 through commercial search engines, such as Google®, Yahoo®, and MSN®. For example, if a user enters the word, "cow" in Google's image search box, many unregistered images may be retrieved, as shown, for example, in FIG. 4. After being presented with search results showing a collection of unregistered images, the user may select one of these unregistered images for registration as second image 410. For example, as shown in FIG. 4, the leftmost image in the first row in a set of retrieved images may be selected and registered as second image 410 to be segmented along with first image 310.

Figure 5:
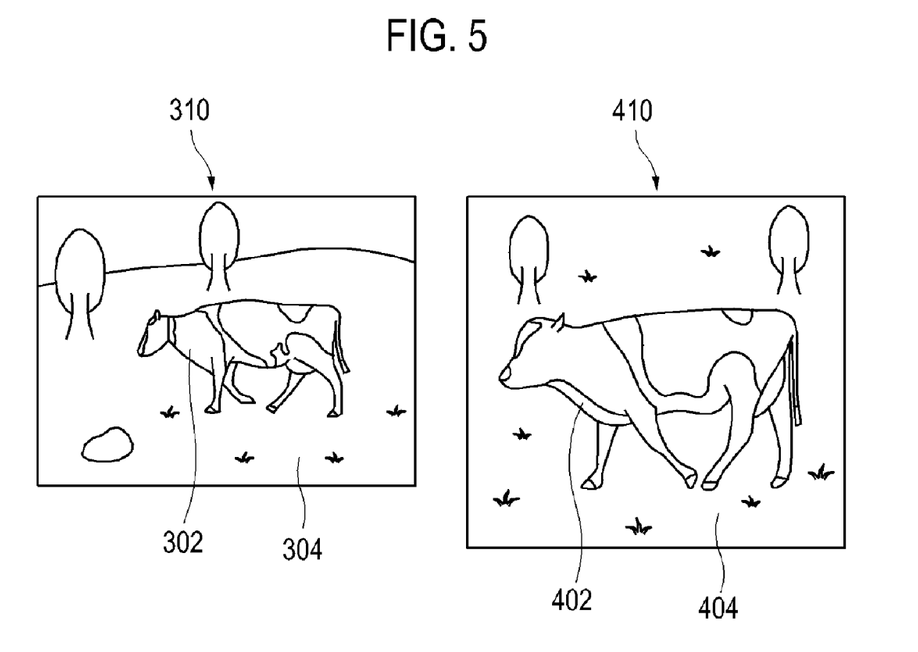
FIG. 5 shows an illustrative embodiment of the first and second images arranged side-by-side.

Once first and second images 310 and 410 are registered, these images 310 and 410 may be arranged side-by-side on display 126, as shown in FIG. 5. In the same above-mentioned example, as shown in FIG. 5, the same illustrative cow representing first segmentable object 302 may be depicted in second image 410 with a comparatively different background than that which is shown in first image 310, and represents second segmentable object 402. The cow may then be subject to segmentation from second image 410.

Figure 6:
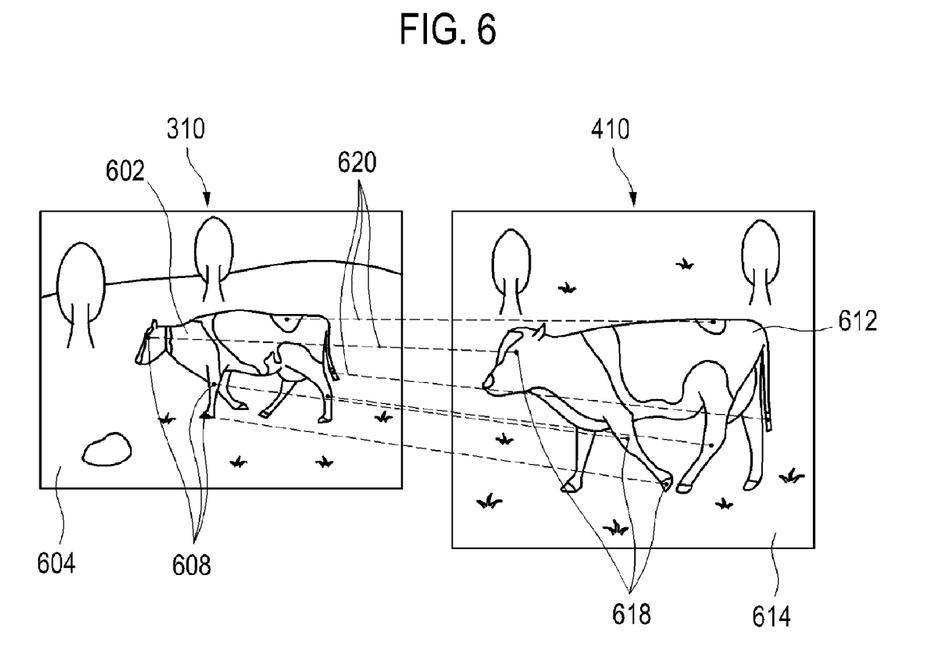
FIG. 6 shows an illustrative embodiment of matched feature points in foreground areas.
Figure 7:
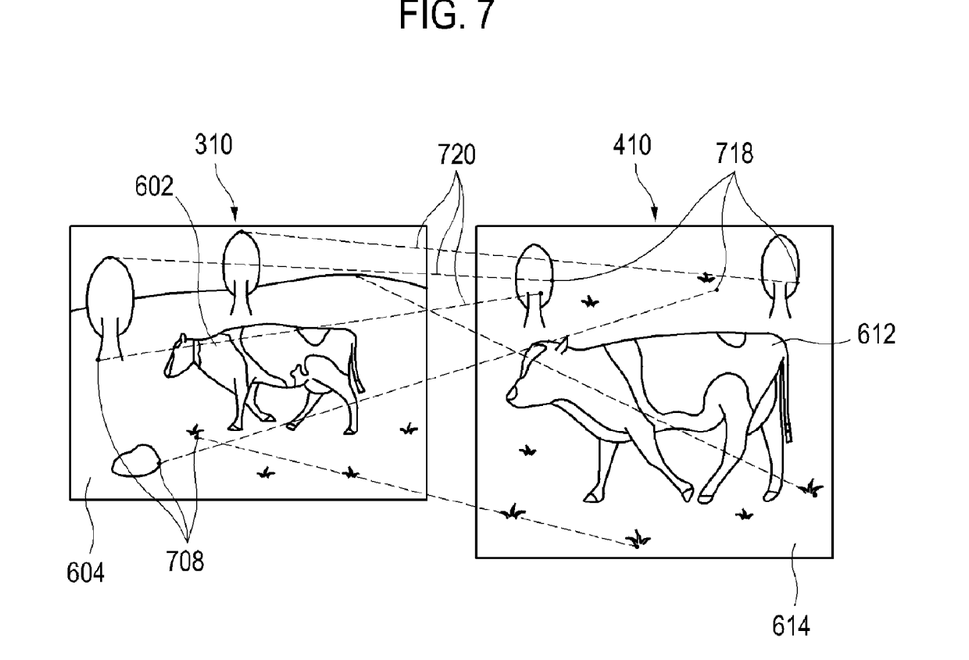
FIG. 7 shows an illustrative embodiment of matched feature points in background areas.

Referring back to FIG. 2, at block 206, processing unit 124 may extract a plurality of first feature points 608 and 708 from first image 310. At block 208, a plurality of second feature points 618 and 718 may be extracted from second image 410. As shown in FIGS. 6 and 7, feature points 608, 618, 708, and 718 may be local feature points in the images. For example, in some embodiments, the feature points may be scale-invariant feature transformation (SIFT) feature points identified using known techniques. SIFT feature points may be feature points that are relatively unaffected by changes in illumination, noise, and minor changes in viewpoint. In addition to these properties, SIFT feature points may be distinctive, relatively easy to extract, and allow for object identification with a relatively low probability of mismatch.

Hereinafter, a process of extracting SIFT feature points from an image, such as image 310, will be described for illustrative purposes. The same or similar process may be performed to extract SIFT feature points from image 410. However, claimed subject matter is not limited to the extraction of feature points using SIFT techniques.

In a SIFT process, first image 310 may first be convolved with a plurality of Gaussian filters at different scales to generate successive Gaussian-blurred images, and then difference images between the successive Gaussian-blurred images (Gaussians) may be taken. SIFT features may then be identified as maxima/minima of the difference of Gaussians (DoG) images that occur at multiple scales. More specifically, the DoG images may be given by Equation 1 below.

$$D(x, y, \sigma) = L(x, y, k_i\sigma) - L(x, y, k_j\sigma) \qquad \text{(Equation 1)}$$

where x and y represent pixel positions of an image in the horizontal and vertical axes, respectively, $\sigma$ and $k\sigma$ represent image scales, and $L(x, y, k\sigma)$ represents the first image $I(x, y)$ convolved with the Gaussian blur $G(x, y, k\sigma)$ at scale $k\sigma$, i.e., $L(x, y, k\sigma) = G(x, y, k\sigma) * I(x, y)$.

As can be seen from Equation 1 above, the DoG image between scales $k_i\sigma$ and $k_j\sigma$ corresponds to the difference between the Gaussian-blurred images at scales $k_i\sigma$ and $k_j\sigma$. For scale-space extrema detection in a SIFT algorithm, first image 310 may be first convolved with the Gaussian-blurred images at different scales. The convolved images may be grouped by octave (where an octave corresponds to a doubling of the value of σ), and the value of $k_i$ may be selected so as to obtain a fixed number of convolved images per octave. Then the DoG images may be taken from adjacent Gaussian-blurred images per octave. Once the DoG images have been obtained, the SIFT features may be identified as local minima/maxima of the DoG images across scales. This may be done by comparing each pixel in the DoG images to its eight neighboring pixels at the same scale and nine corresponding neighboring pixels at each of the neighboring scales. If a particular pixel value is the maximum or minimum among all the compared pixels, it may be selected as a candidate SIFT feature point.

Referring back to FIG. 2, at block 210, processing unit 124 may compare the feature points of first image 310 with those of second image 410 to find matching feature points. At least some first feature points 608 and 708 may be matched with at least some second feature points 618 and 718 so as to identify a plurality of matched feature points 620 for at least one of first and second images 310 and 410. In one embodiment by way of non-limiting example, if an arbitrary one of second feature points 618 and 718 of second image 410 has substantially the same pixel value as one of first feature points of first image 310, then a match may be found between them thereby identifying feature points 608 and 618 as matched feature points 620. In this respect, at least some of first feature points 608 and 708 may be identified as matched feature points 620, and at least some of second feature points 618 and 718 may be identified as the matched feature points 620. For illustrative purposes, respective pairs of the matched feature points are represented by connecting lines 620 between the matched feature points 608 in first image 310 and corresponding matched feature points 618 in second image 410 (see FIG. 6).

As shown in FIG. 7, if first feature points 708 are randomly matched with second feature points 718, no connection may be made between those randomly matched feature points. Feature points 708 and 718 in first and second images 310 and 410, respectively, may be random feature points 720 (illustrated by connecting lines 720), indicating no relationship between the objects in first and second images 310 and 410. Once it is determined that the feature points are either matched feature points 620 or random feature points 720, first and second images 310 and 410 may be classified into foreground areas 602 and 612 and background areas 604 and 614.

Referring back to FIG. 2, at block 212, processing unit 124 may classify matched feature points in first and second images 310 and 410 into foreground areas and background areas. Processing unit 124 may classify matched feature points based at least in part on whether the plurality of matched feature points exhibit geometrical relations. For example, with reference to FIG. 6, processing unit 124 may classify first feature points 608 in first image 310 and corresponding second feature points 618 in second image 410 exhibiting geometrically consistent relationships as belonging to foreground areas 602 and 612 of first and second images 310 and 410, respectively. Likewise, with reference to FIG. 7, processing unit 124 may classify randomly matched feature points 708 in first image 310 and corresponding randomly matched feature points 718 in second image 410 exhibiting geometrically inconsistent relationships as belonging to background areas 604 and 614 of first and second images 310 and 410, respectively.

Figure 8:
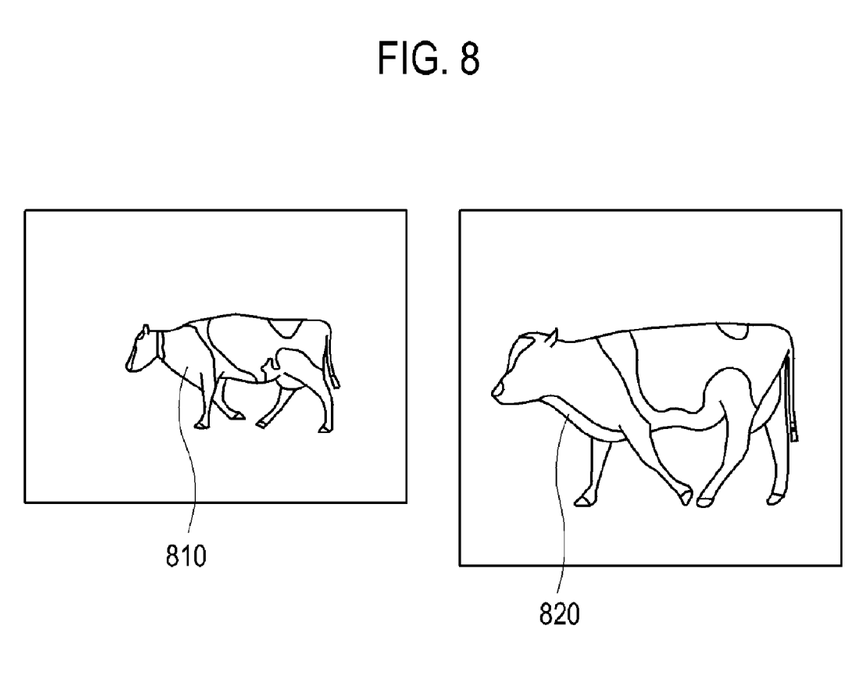
FIG. 8 shows an illustrative embodiment of segmented objects.

Referring back to FIG. 2, at block 214, processing unit 124 may segment at least one of the segmentable objects 302 and 402 in foreground areas 602 and 612 of respective one of first and second images 310 and 410 based on matched feature points in foreground areas 602 and 612. In one embodiment by way of non-limiting example, segmentation of first and second segmentable objects 302 and 402 may be aided by the GrabCut technique or similar schemes such as "Magic Wand," "Intelligent Scissors," "Bayes Matting," "Knockout 2," "Graph Cut," "Level Sets," etc. When employing GrabCut techniques, first feature points 608 in first image 310 and corresponding second feature points 618 in second image 410 may be used as input parameters. FIG. 8 shows an illustrative embodiment of segmented objects 810 and 820 that may be produced as a result of performing block 214.

If it is determined that the quality of the segmented objects in performing block 214 is satisfactory, then the process may end processing. If, on the other hand, the segmented objects are not of satisfactory quality, the process may be undertaken using larger numbers of matched feature points. That is, the higher the number of matched feature points 620, the more likely it is that the image quality will be better. For example, 100 matched feature points may result in an acceptable quality segmented object 810 or 820, while 300, 500, or 1000 feature points may result in a higher quality segmented object 810 or 820.

Alternatively, if it is determined that the segmented objects are not satisfactory in quality, a third image 420 having a third segmentable object 406 (shown in FIG. 4) having visually properties substantially similar to first segmentable object 302 in first image 310 may be selected to obtain a higher quality segmented object 810 or 820. Third image 420 may be registered by the same process as shown at block 204. For example, the user may select third image 420 as shown in FIG. 4. If necessary, additional images may be used to perform the segmentation of objects. Further, by way of non-limiting example, as shown in FIG. 4, third object 406 may be pre-segmented. In some implementations, a pre-segmented object such as third object 406 may yield comparatively better results when combined with images 310 and 410.

In some implementations, user input may be received when using GrabCut techniques at block 214. Such user input may include a user manually designating portions of foreground areas 602 and 612. After receiving a user's manual input designating portions of foreground areas 602 and 612, block 214 may be repeated.

In yet other embodiments, first image 310 having first segmentable object 302 can be used to segment a fourth image (not shown) having an object similar to segmented object 810 in first image 310. First image 310 having segmented object 302 can be obtained via process described above with reference to FIG. 2, or may be selected from memory 122 or databases of other computing devices (not shown) through network 140. The fourth image can also be selected from memory 122 or databases of other computing devices through network 140. In this embodiment, since the feature points of first image 310 have been already classified into foreground area 602 or background area 604, an object in the fourth image may be segmented.

For this and other processes and methods disclosed herein, one skilled in the art can appreciate that the functions performed in the processes and methods may be implemented in different order. Further, the outlined steps and operations are provided as examples. That is, some of the steps and operations may be optional, combined into fewer steps and operations, or expanded into additional steps and operations without detracting from the essence of the disclosed embodiments.

In light of the present disclosure, those skilled in the art will appreciate that the apparatus and methods described herein may be implemented in hardware, software, firmware, middleware, or combinations thereof and utilized in systems, subsystems, components, or sub-components thereof For example, a method implemented in software may include computer code to perform the operations of the method. This computer code may be stored in a machine-readable medium, such as a processor-readable medium or a computer program product, or transmitted as a computer data signal embodied in a carrier wave, or a signal modulated by a carrier, over a transmission medium or communication link. The machine-readable medium or processor-readable medium may include any medium capable of storing or transferring information in a form readable and executable by a machine (e.g., by a processor, a computer, etc.).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for segmenting images comprising:
registering a first image having a first segmentable object;
registering a second image having a second segmentable object, the second segmentable object having visual properties similar to the first segmentable object;
extracting a plurality of first feature points from the first image; extracting a plurality of second feature points from the second image;
matching at least a portion of the plurality of first feature points with at least a portion of the plurality of second feature points to identify a plurality of matched feature points for at least one of the first and second images;
classifying the plurality of matched feature points as one of a foreground area and a background area;
segmenting at least one of the first and second segmentable objects from at least a respective one of the first and second images based on the plurality of matched feature points in the foreground area;
registering a third image having a third segmentable object with visual properties substantially similar to the first segmentable object;
extracting a plurality of third feature points from the third image;
matching at least a portion of the plurality of matched feature points with at least a portion of the plurality of third feature points so as to identify a plurality of commonly matched feature points between the first, second and third images;
classifying the plurality of commonly matched feature points as one of a foreground area and a background area; and
segmenting at least one of the first, second and third segmentable objects from at least a respective one of the first, second and third images based on the plurality of commonly matched feature points in the foreground area.

2. The method of claim 1, wherein the segmenting comprises: performing a GrabCut operation upon at least one of the first and second images.

3. The method of claim 1, wherein the plurality of first feature points and the plurality of second feature points comprise scale-invariant feature transformation (SIFT) feature points.

4. The method of claim 1, wherein registering the second image comprises:
retrieving unregistered images using contents-based image retrieval (CBIR);
and selecting an image from the unregistered images having visual properties substantially similar to the first segmentable object in the first image.

5. The method of claim 1, further comprising, before segmenting at least one of the first and second segmentable objects, receiving user input for selecting the foreground area of at least one of the first and second images, and wherein segmenting comprises performing a GrabCut operation upon the selected foreground area.

6. A non-transitory computer-readable medium storing instructions that, when executed by a computer, cause the computer to perform a method for segmenting images comprising:
registering a first image having a first segmentable object;
registering a second image having a second segmentable object with visual properties similar to the first segmentable object;
extracting a plurality of first feature points from the first image;
extracting a plurality of second feature points from the second image;
matching at least a portion of the plurality of first feature points with at least a portion of the plurality of second feature points to identify a plurality of matched feature points for at least one of the first and second images;
classifying the plurality of matched feature points as one of a foreground area and a background area;
segmenting at least one of the first and second segmentable objects from at least a respective one of the first and second images based on the plurality of matched feature points in the foreground area;
registering a third image having a third segmentable object with visual properties substantially similar to the first segmentable object;
extracting a plurality of third feature points from the third image;
matching at least a portion of the plurality of matched feature points with at least a portion of the plurality of third feature points so as to identify a plurality of commonly matched feature points between the first, second and third images;
classifying the plurality of commonly matched feature points as one of a foreground area and a background area; and
segmenting at least one of the first, second and third segmentable objects from at least a respective one of the first, second and third images based on the plurality of commonly matched feature points in the foreground area.

7. The computer-readable medium of claim 6, wherein segmenting at least one of the first and second segmentable objects comprises performing a GrabCut operation upon at least one of the first and second images.

8. The computer-readable medium of claim 6, wherein the plurality of first feature points and the plurality of second feature points comprise SIFT feature points.

* * * * *